United States Patent [19]

Shoemaker et al.

[11] Patent Number: 4,588,322
[45] Date of Patent: May 13, 1986

[54] MOTOR SHAFT BEARING SUPPORT AND DISCONNECT

[75] Inventors: James E. Shoemaker, Glenview; Gilbert M. Younger, Mt. Prospect, both of Ill.

[73] Assignee: A. Lakin & Sons, Inc., Chicago, Ill.

[21] Appl. No.: 623,580

[22] Filed: Jun. 22, 1984

[51] Int. Cl.⁴ .............................................. F16D 1/06
[52] U.S. Cl. ........................................ 403/1; 403/301; 403/359; 74/625; 192/95
[58] Field of Search .......................... 403/1, 359, 301; 74/553, 625; 192/95

[56] References Cited

U.S. PATENT DOCUMENTS

| | | | |
|---|---|---|---|
| 2,724,289 | 11/1955 | Wight | 74/625 |
| 3,026,744 | 3/1962 | Rouse | 74/625 |
| 4,223,772 | 9/1980 | Telford | 403/1 |
| 4,273,460 | 6/1981 | Ueno | 403/1 |
| 4,378,868 | 4/1983 | Petrak | 403/1 |

Primary Examiner—Cornelius J. Husar
Assistant Examiner—Peter M. Cuomo
Attorney, Agent, or Firm—Gary, Juettner & Pyle

[57] ABSTRACT

A bearing support and disconnect for a motor shaft is provided as a separate unit connected to the motor shaft. The unit includes a bearing mounted spindle and a shiftable member for bringing the spindle into and out of driving relation with the motor shaft.

10 Claims, 4 Drawing Figures

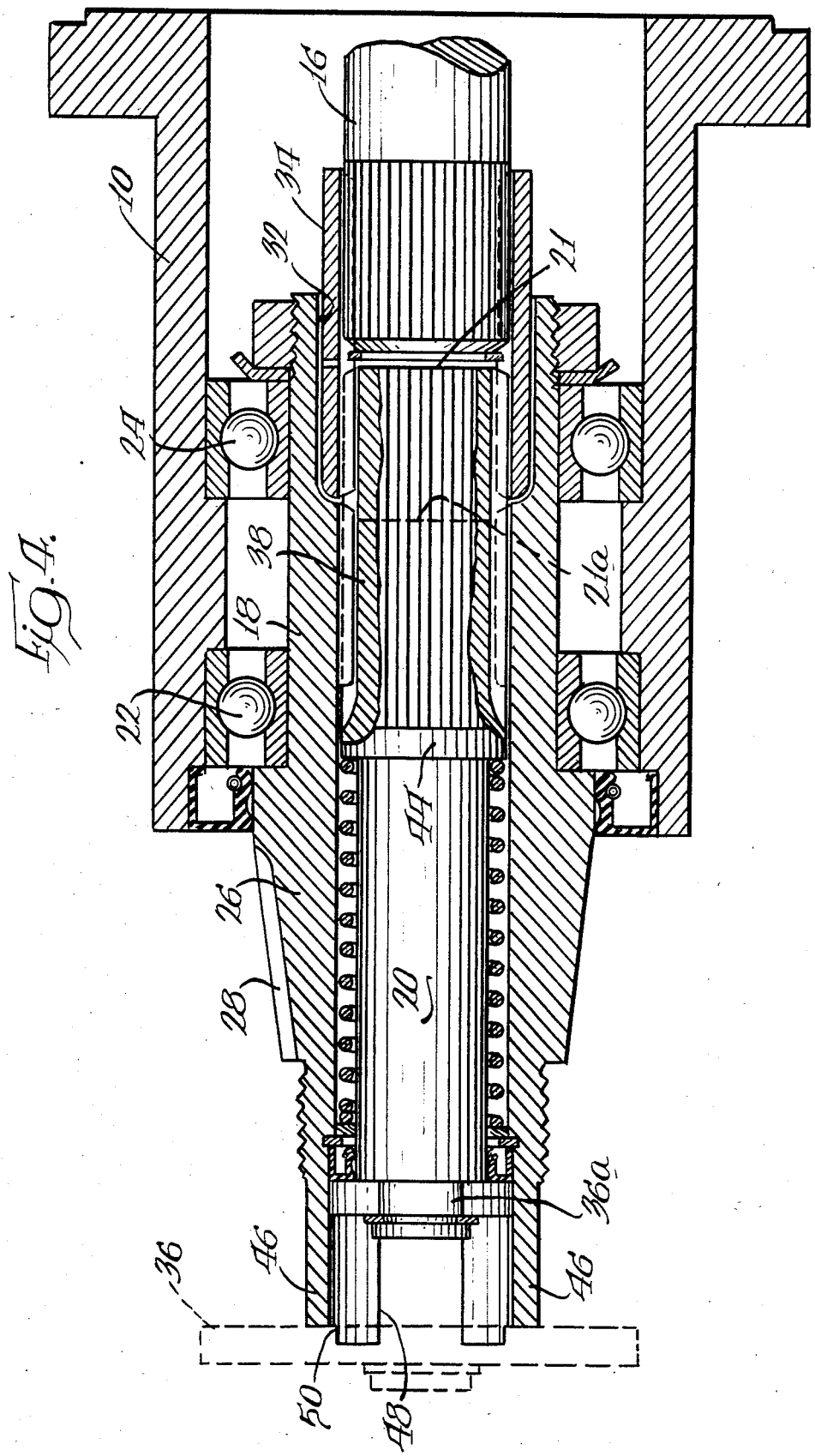

MOTOR SHAFT BEARING SUPPORT AND DISCONNECT

BACKGROUND OF THE INVENTION

This invention relates generally to a rotary mechanism driven by the shaft of a hydraulic motor wherein the device carries a member to be rotated and contains means to selectively engage and disengage driving connection between the shaft and the device.

Hydraulic motors, i.e., motors operated by the flow of pressurized hydraulic fluid, are used to drive a variety of devices, including the individual wheels of agricultural, industrial and construction vehicles and equipment.

In many cases, it would be desirable to provide a means to disconnect the motor from the device being driven. For example in the case of a wheeled vehicle, practical difficulties arise if the hydraulic system fails or the vehicle must be moved over a relatively long distance. Since the speed of a hydraulic motor is relatively slow, it is impractical to move a wheeled device over a long distance. The vehicle cannot be pushed or towed rapidly due to the resistance of the hydraulic fluid in the system. Instead, the vehicle must be lifted and placed on a trailer, which is an inconvenient and time consuming procedure. Many other examples may be visualized by those skilled in the art wherein it would be desirable to easily and quickly disconnect from the output shaft of a hydraulic motor without having to remove the motor or otherwise dismantle the device or wheel connected to the motor. Such disconnect, for example, would allow a wheeled vehicle to be pushed or towed at a fast rate of speed without hindrance from, or damage to, the hydraulic system.

Also, in connection with the use of hydraulic motors, the load on the device being rotated is normally carried solely by the motor shaft and bearings. Under high loads, the bearings may fail prematurely. Shaft breakage may also occur. Thus, it would be desirable to provide additional support for the hydraulic motor, whereby the motor shaft would be free of radial and axial load in both the connected and disconnected positions.

SUMMARY OF THE INVENTION

In accordance with the present invention, the output shaft of a motor is associated with a disconnect device, which carries the object, i.e., a wheel, to be rotated. The disconnect device includes an axially slidable shaft coaxial with the motor shaft, and a spindle around the shaft. The sliding shaft is in constant driving relation with the spindle and is movable into and out of driving relation with the motor shaft via a coupling. The wheel is mounted around the spindle, such that the disconnect is operated by moving the shaft into and out of engagement with the motor shaft. The spindle, housing and bearings provide additional support for the wheel at all times while relieving the motor shaft of any axial and radial loading. The motor shaft only transmits torque load.

The disconnect device is compact and easily connected to a variety of standard hydraulic motors. The shaft of the disconnect projects externally from one side of the device, allowing convenient and easy shifting into and out of a driving relationship.

THE DRAWINGS

FIG. 4 is a sectional view of the device shown in FIG. 1.

DESCRIPTION OF THE PREFERRED EMBODIMENT

Figure 1:
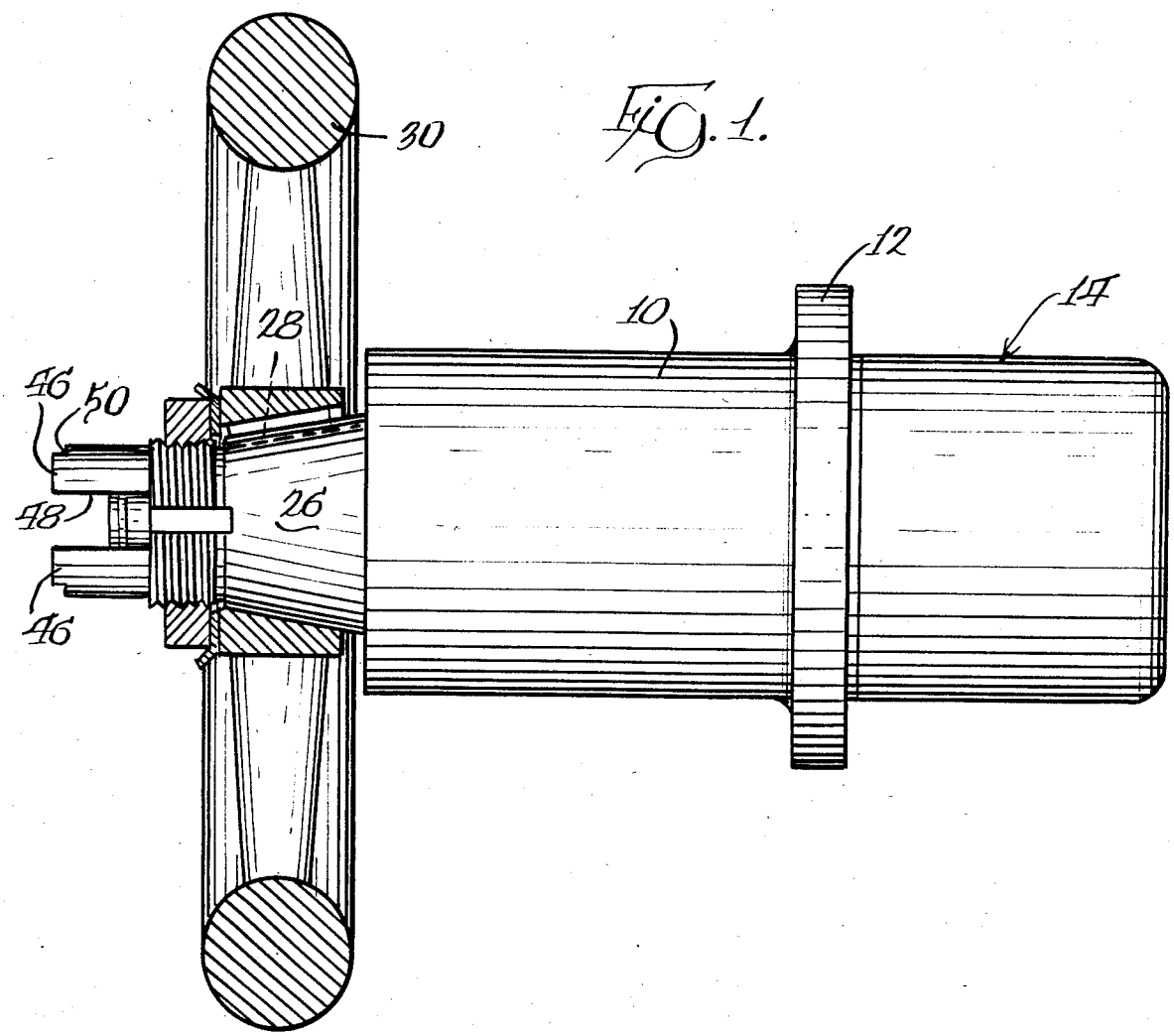
FIG. 1 is a plan view of the disconnect device of the present invention, illustrated in conjunction with a hydraulic motor shown in outline.

As shown in FIG. 1, the device of the present invention comprises a cylindrical housing 10 having a flanged end 12 for connection to a hydraulic motor 14. The motor 14 has an output shaft 16 (FIG. 4) that extends axially centrally into the interior of the housing. The flanged end has bolt openings 15 to enable mounting of the device on a support, such that the device carries the load.

As shown in FIGS. 1–4, the disconnect device comprises a spindle 18 having an axial bore therethrough that receives a disconnect shaft 20 in sliding engagement. The outer portion of the spindle 18 comprises surfaces which are supported by and engaged with inner races of spaced ball or roller bearings 22 and 24 supported between the inner surface of the housing 10 and the spindle 18. A portion 26 of the spindle 18 extends outwardly from the housing on the side opposite to that at which the motor is located. The spindle portion 26 may have a tapered or conical surface and a keyway 28 to enable mounting of a wheel or hub, schematically shown at 30, or other object to be rotated. Other objects, for example, could include a gear, a cam, or a variety of other objects that are rotated to perform a useful function. As shown, seals are provided between the shaft 20, spindle 18 and housing 10 to prevent contamination by foreign elements and leakage of lubricant.

The end of the spindle 18 adjacent the motor 14 has an enlarged cylindrical opening 32 that rotatably receives a cylindrical coupling or sleeve 34 having an inner splined female surface. The male end of the motor shaft 16 is also splined and is in constant driving engagement with the sleeve 34.

As mentioned previously, the disconnect shaft 20 slides axially in the spindle 18 between inner and outer limits as will be defined herein. The internal end of the disengage shaft 20 is splined and is movable into and out of driving engagement with the sleeve 34 by moving the shaft to the right as shown in the drawings. The other end of the shaft 20 projects beyond the end of the housing 10 and spindle 18 in the disengaged position and terminates in a handle 36 to enable rotation of the handle externally of the device.

The shaft 20 is in constant driving relation with the spindle 18 regardless of axial movement of the shaft. As shown in FIG. 4, a splined engagement is provided at 38 between the shaft and sleeve around an area immediately adjacent to the sleeve 34. Thus, as the shaft 20 is moved outwardly, the splined end, formerly in engagement with the sleeve 34, will move into the area 38 and continue to remain in driving engagement with the spindle 18.

Also, as shown in FIG. 4, a compressed helical spring 40 is provided between the shaft 20 and spindle in a location adjacent to area 38. The outer end of the spring 40 engages a ring 42 extending from the spindle, and the inner end engages a shoulder 44 on the shaft 20. The spring therefore resiliently urges the shaft 20 toward the engaged position and prevents the shaft from disengaging when in a driving relationship.

Figure 2:
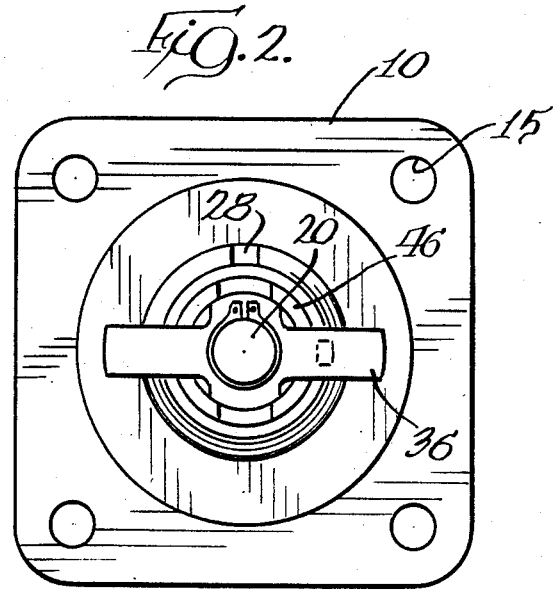
FIG. 2 is a view of one end of the device, shown as the left-hand end of FIG. 1.
Figure 3:
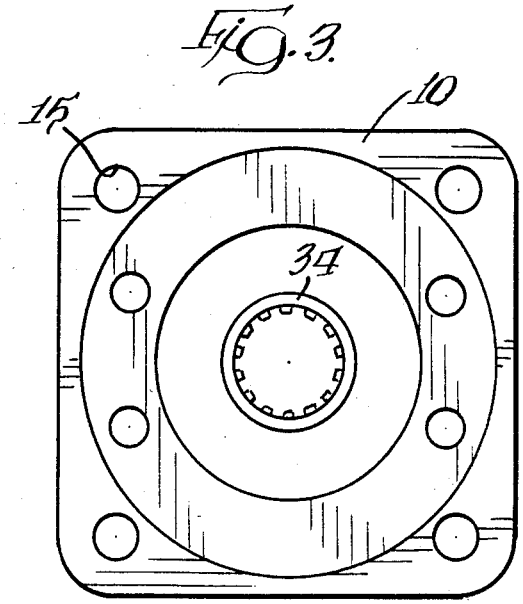
FIG. 3 is a view of the other end of the device with the motor removed.

As shown in FIGS. 1, 2 and 4, the outer end of the spindle 18 comprises an outwardly facing U-shaped member including a pair of outwardly facing projections 46 having a slot 48 therebetween for receiving the handle 36. When the shaft 20 is in the engaged position, as shown in FIGS. 1 and 2, the handle 36 is positioned at the bottom of the slot. When the shaft is disconnected, the handle is pulled outward and rotated to rest on the projections 46, which may have slightly recessed areas 50 to receive the handle and lock it in position by preventing rotation and inward movement.

The operation of the device of the present invention will now be described with reference to FIG. 4.

With the handle 36 in the outer position as shown with dotted lines, the inner end 21 of shaft 20 is disconnected from the sleeve 34, said inner end being located as indicated by the dotted lines at 21a. Rotation of the motor shaft 16 will cause only rotation of the sleeve 34 within the opening 32, and no motion will be transmitted to the shaft 20 or spindle 18. This leaves the spindle and shaft isolated to rotate freely on the bearings 22 and 24 without resistance from the motor.

In order to engage the disconnect shaft 20, the handle 36 is rotated and pushed into the slot 48 to the handle position shown at 36a, such that the splined inner end of the shaft engages in driving relation with the sleeve 34, which is in turn coupled with the motor shaft 16. Rotation of the motor shaft causes rotation of shaft 20 and spindle 18, which is always in driving engagement with shaft 20. The driving force on the spindle is in turn imparted to the wheel or other object secured around the outer hub of the spindle.

As stated previously, the housing 10 of the device is mounted on a support (not shown) by virtue of the bolt holes 15. As a result, the axial and radial loads on the wheel or hub 30 are carried by the housing 10, bearings 24 and spindle 18 rather than the motor 14 or motor shaft 16. In conventional applications, such radial and axial loads would be carried solely by the motor and its shaft. Since the motor shaft 16 is required to carry only the torque load, a smaller motor, i.e., one having lower radial and axial load ratings, may be used. Conversely, the effective radial and axial load carrying capacity of a standard motor may be increased substantially, up to several times the rated capacity with the use of the device of the present invention.

We claim:

1. A device for providing a disconnect between a motor having a rotary output shaft and an object to be rotated thereby, said device comprising a second shaft mounted adjacent to the end of the motor shaft coaxial therewith, a spindle around the second shaft, said second shaft being axially slidable in said spindle and in constant rotary driving relation therewith, and disconnect means for providing rotary drive connection and disconnection between said second shaft and motor shaft upon movement of said second shaft toward and away from said motor shaft, said disconnect means comprising a sleeve, one portion of said sleeve being disposed around said motor shaft in constant driving relation therewith, and another portion of said sleeve being engageable with an end of the second shaft in driving relation.

2. The device of claim 1 wherein rotation of said spindle is supported by spaced bearings.

3. The device of claim 1 wherein said object to be rotated is mounted on said spindle.

4. The device of claim 1 wherein means are provided between said second shaft and spindle for possitively moving the second shaft axially into engaged and disengaged positions.

5. The device of claim 4 wherein spring means are provided for urging said second shaft toward said engaged position.

6. A bearing supported drive disconnect device for a motor having a housing and a driven shaft, said device comprising a second housing secured to said motor housing and receiving said driven shaft, a spindle within said second housing operatively associated with the end of said driven shaft, bearing means between said second housing and said spindle for rotatably supporting for said spindle, and means for drivingly connecting and disconnecting said spindle and said driven shaft, said means comprising a second shaft extending coaxially from the motor shaft, said second shaft being in driving relationship with the spindle and being movable into and out of driving relation with said driven shaft.

7. The device of claim 6 wherein said shaft is manually adjustable externally of said housing.

8. The device of claim 6 wherein a portion of said spindle extends beyond said housing, and an object is mounted on said portion for rotation with said spindle.

9. The device of claim 6 wherein the driven shaft has a splined end, and wherein the means for drivingly connecting and disconnecting said spindle and said driven shaft comprises an axial bore in said spindle, a second sliding shaft received in said bore in coaxial relation with said driven shaft, an end of said second shaft being adjacent to the end of the driven shaft and being splined, and a sleeve mounted for rotation relative to said spindle, said sleeve having an inner splined surface in constant rotary driving relation with the splined end of the driven shaft, the splined end of said second shaft being axially movable into and out of driving relation with said sleeve, and means for providing constant rotary driving relation between said spindle and second shaft irrespective of the axial position thereof.

10. The device of claim 6 wherein an object is mounted for rotation on said spindle, and means are provided for supporting said housing, whereby axial and radial loads on said object are supported by said device rather than the motor and motor shaft.

* * * * *